US010621560B1

(12) United States Patent
Rickert

(10) Patent No.: US 10,621,560 B1
(45) Date of Patent: Apr. 14, 2020

(54) METHOD AND SYSTEM FOR TEXTING LEGAL CANNABIS AS A GIFT

(71) Applicant: PintPass, LLC, Bozeman, MT (US)

(72) Inventor: Ryan Rickert, Bozeman, MT (US)

(73) Assignee: PintPass, LLC, Bozeman, MT (US)

( * ) Notice: Subject to any disclaimer, the term of this patent is extended or adjusted under 35 U.S.C. 154(b) by 43 days.

(21) Appl. No.: 15/699,729

(22) Filed: Sep. 8, 2017

Related U.S. Application Data

(60) Provisional application No. 62/360,264, filed on Jul. 8, 2016.

(51) Int. Cl.
| | | |
|---|---|---|
| *G06Q 20/04* | (2012.01) | |
| *G06Q 30/06* | (2012.01) | |
| *H04L 29/08* | (2006.01) | |
| *H04W 4/02* | (2018.01) | |
| *H04W 4/70* | (2018.01) | |
| *H04W 4/60* | (2018.01) | |

(52) U.S. Cl.
CPC ......... *G06Q 20/0457* (2013.01); *G06Q 30/06* (2013.01); *H04L 67/26* (2013.01); *H04W 4/023* (2013.01); *H04W 4/60* (2018.02); *H04W 4/70* (2018.02)

(58) Field of Classification Search
CPC ..... G06Q 20/0457; G06Q 30/06; H04W 4/70; H04W 4/60; H04W 4/023; H04L 67/26
See application file for complete search history.

(56) References Cited

U.S. PATENT DOCUMENTS

| | | | | |
|---|---|---|---|---|
| 2008/0052164 A1* | 2/2008 | Abifaker | ................ | G06Q 20/10 705/14.27 |
| 2009/0094134 A1* | 4/2009 | Toomer | .................. | G06Q 10/10 705/26.1 |
| 2009/0259562 A1* | 10/2009 | Choi | ...................... | G06Q 30/02 705/26.1 |
| 2011/0047039 A1* | 2/2011 | Crames | ................ | G06Q 20/206 705/18 |
| 2011/0313874 A1* | 12/2011 | Hardie | .................... | H04W 4/02 705/26.1 |

(Continued)

OTHER PUBLICATIONS

Cutler, Kim-Mai. "Giftly's New App Lets You Send Any Gift to Friends, Family Straight From Your iPhone". Retrieved from <https://techcrunch.com/2012/09/06/giftly-mobile-app/> on Mar. 7, 2019. Originally published Sep. 2012.*

(Continued)

*Primary Examiner* — Nathan A Mitchell
(74) *Attorney, Agent, or Firm* — Staniford Tomita LLP

(57) ABSTRACT

Cannabis gifts can be transmitted from a first mobile computing device to a second mobile computing device that run an application program. The mobile computing devices communicate with a server and data for the system users is stored on a database. When cannabis products are gifted, a unique token generated by the server and a gift message is transmitted to the second mobile computing device. The user can go to a cannabis provider and redeem the gift credit by showing the user interface to a staff member of the cannabis provider. The server can record the unique token for the cannabis gift as being used and records the value of the cannabis gift with the food or beverage provider. The server forwards payment for the value of the cannabis gift to the cannabis provider.

20 Claims, 23 Drawing Sheets

(56) References Cited

U.S. PATENT DOCUMENTS

| | | | | |
|---|---|---|---|---|
| 2012/0226588 A1* | 9/2012 | Wuhrer | ............... | G06Q 30/06 705/27.1 |
| 2012/0284174 A1* | 11/2012 | Bentley | ............... | G06Q 30/02 705/39 |
| 2013/0080321 A1* | 3/2013 | Mulhall | ............... | G06Q 30/02 705/41 |
| 2014/0136349 A1* | 5/2014 | Dave | ............... | G06Q 20/20 705/16 |
| 2014/0143089 A1* | 5/2014 | Campos | ............... | G06Q 20/36 705/26.8 |
| 2014/0258055 A1* | 9/2014 | Wolfe | ............... | G06Q 20/105 705/30 |
| 2014/0351015 A1* | 11/2014 | Ehn | ............... | G06Q 30/02 705/7.31 |
| 2015/0088753 A1* | 3/2015 | Van Der Schueren | ............... | G06Q 20/351 705/67 |
| 2015/0302373 A1* | 10/2015 | Choi | ............... | G06Q 20/12 705/26.8 |
| 2015/0310534 A1* | 10/2015 | Choi | ............... | G06Q 30/0633 705/26.8 |
| 2016/0005028 A1* | 1/2016 | Mayblum | ............... | G06Q 20/342 705/26.81 |
| 2016/0012465 A1* | 1/2016 | Sharp | ............... | G06Q 20/18 705/14.17 |
| 2016/0055518 A1* | 2/2016 | Ahn | ............... | G06Q 30/0207 705/14.39 |
| 2017/0046695 A1* | 2/2017 | Collings | ............... | G06K 19/06037 |
| 2017/0286965 A1* | 10/2017 | Erwin | ............... | G06Q 20/40145 |
| 2017/0308890 A1* | 10/2017 | Yankovich | ............... | G06Q 30/06 |
| 2018/0165675 A1* | 6/2018 | Isaacson | ............... | G06Q 20/34 |

OTHER PUBLICATIONS

Grove, Jesse. "Best Gift for Christmas | Marijuana Gift Cards". Retrieved from <https://dopedirectory.com/dispensary-news/best-gift-for-christmas-marijuana-gift-cards/> on Mar. 7, 2019. Originally published Dec. 2014.*

Finocchiaro, Peter. "Mobile gifting app lets friends buy each other drinks". Retrieved from <https://www.retaildive.com/ex/mobilecommercedaily/mobile-gifting-app-lets-friends-buy-each-other-drinks> on Mar. 7, 2019.*

* cited by examiner

GIFTED CANNABIS

— 155

Unclaimed Cannabis:

MARCUS JONES GIFTED YOU $15.00
Tuesday March 13, 2016

ALICIA ORWELL GIFTED YOU $50.00
Saturday January 5, 2016

Claimed Cannabis:

MARY STEVENS GIFTED YOU $10.00
Monday December 20, 2015

Gifted Cannabis:

YOU GIFTED BRIAN JOHNSON $25.00
Monday April 20, 2016

METHOD AND SYSTEM FOR TEXTING LEGAL CANNABIS AS A GIFT

CROSS REFERENCE TO RELATED APPLICATIONS

This application claims priority to U.S. Provisional Patent Application No. 62/360,264, "Method And System For Texting Legal Cannabis As A Gift" filed Jul. 8, 2016 which is hereby incorporated by reference.

BACKGROUND

It is common for people to give gifts to each other. This act of giving can be accomplished by buying a physical gift. However, when the parties are separated, the gifting process can be more difficult. Gift cards exist which can be purchased and given from a buyer to a recipient. However, this requires purchasing the gift card and delivering the physical card to the recipient. What is needed is a more convenient system and method for gifting cannabis.

DETAILED DESCRIPTION

The present invention may take numerous forms of device and system configurations that will accommodate a diversity of social connecting functions. What follows is a preferred embodiment of the useful novelties of the invention. However, for one skilled in the art it will be obvious that the novel features disclosed may be employed with alternate combinations and arrangements of the invention elements.

The disclosure relates to the field of software-based methods and systems to electronically buy legal cannabis for contacts or friends of system users. In an embodiment, the users can download a software application program or app from an app provider servers such as Apple App Store or Google Play Store. Users can select the app and download it from the app provider server to the user computer device where it is stored in memory. Once downloaded, the user can run the app, which can display a graphical user interface.

Figure 1:
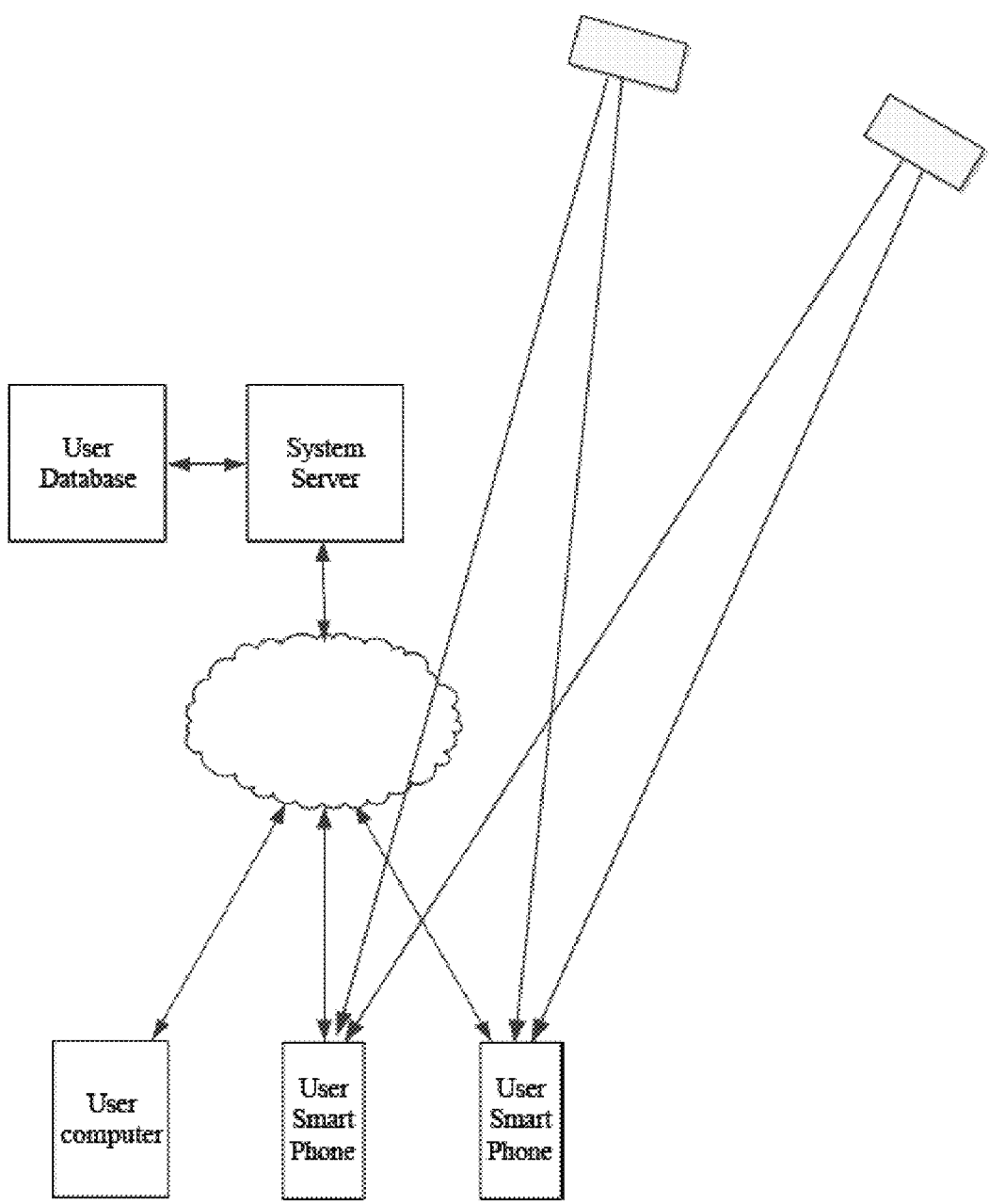
FIG. 1 illustrates an embodiment of a block diagram of the cannabis gifting system components.

With reference to FIG. 1, the system may include a server 111 coupled to a user database 107 either through a network 103 such as the internet or a direct connection. The user database 107 can store user information, user transaction history and other user personal information. The server can communicate with user computers, which can be smart phones 109 or other mobile computing devices that can be equipped with GPS or other location sensors through the network 103 which can include: the Internet, cellular networks, local area networks or any other networks. The user's cell phones 109 can receive signals from GPS satellites 105 and record or detect the user's locations. This user location information can be uploaded and stored on the user database 107.

In an embodiment, in order to use the system, a user can download a software application program or the app from the server 111 to the user's smart phone 109. Once downloaded, the user can run the app on the processor in the smart phone 109 mobile computing device. The system users can create profiles which are stored on the user database 107 coupled to the system server 111. A user profile can be created by either answering questions, inputting user data or downloading personal information from other sources such as Facebook, Google, etc. through a user interface on a smart phone 109 mobile device and/or through another computer 110 in communication with the system server and user database 107. Additional information about the users can be automatically input or manually input in various ways. For example, the user can type the input information or selected location information on a graphical user interface (GUI) map. In other embodiments, a GPS in the smart phone 109 mobile computing device can determine a location of the user. The location information can identify breweries or other food establishments that may be in the areas around the users. In different embodiments, the system illustrated in FIG. 1 can be used for various processes and systems including "Text-A-Bud" and "PuffPass Membership" which are described in more detail below. Although the following description is for gifting of cannabis from retailers and dispensaries, in other embodiments, this system can be used for any other item the dispensaries sell.

Text-A-Bud:

In different embodiments, PuffPass offers members and/or system users the ability to text a cannabis gift (such as a dollar amount in increments of five dollars) to any of their contacts, either by text or email. In an embodiment, a user runs the app and clicks on a user interface button in the app that brings up a form where the user selects or otherwise inputs the intended cannabis recipient, the credit amount, and optionally a personalized message. The cannabis sender's payment card such as credit card or debit card is debited and the gift credit of cannabis is electronically credited to the person that they send it to. The recipient isn't required to become a member to receive the cannabis credit, but may need to enter their name, age, and email to redeem the gift credit. The recipient can go to any PuffPass member dispensary and redeem their cannabis credit for a specific purchase.

A user can first down load the app onto a computing device such as a smart phone and store the application in memory. The user can then run the app on the processor of the computing device. In an embodiment, the computing device can have a location sensor such a GPS. In an embodiment, the user is prompted by the app to allow locations services to determine location based on GPS.

Figure 2:
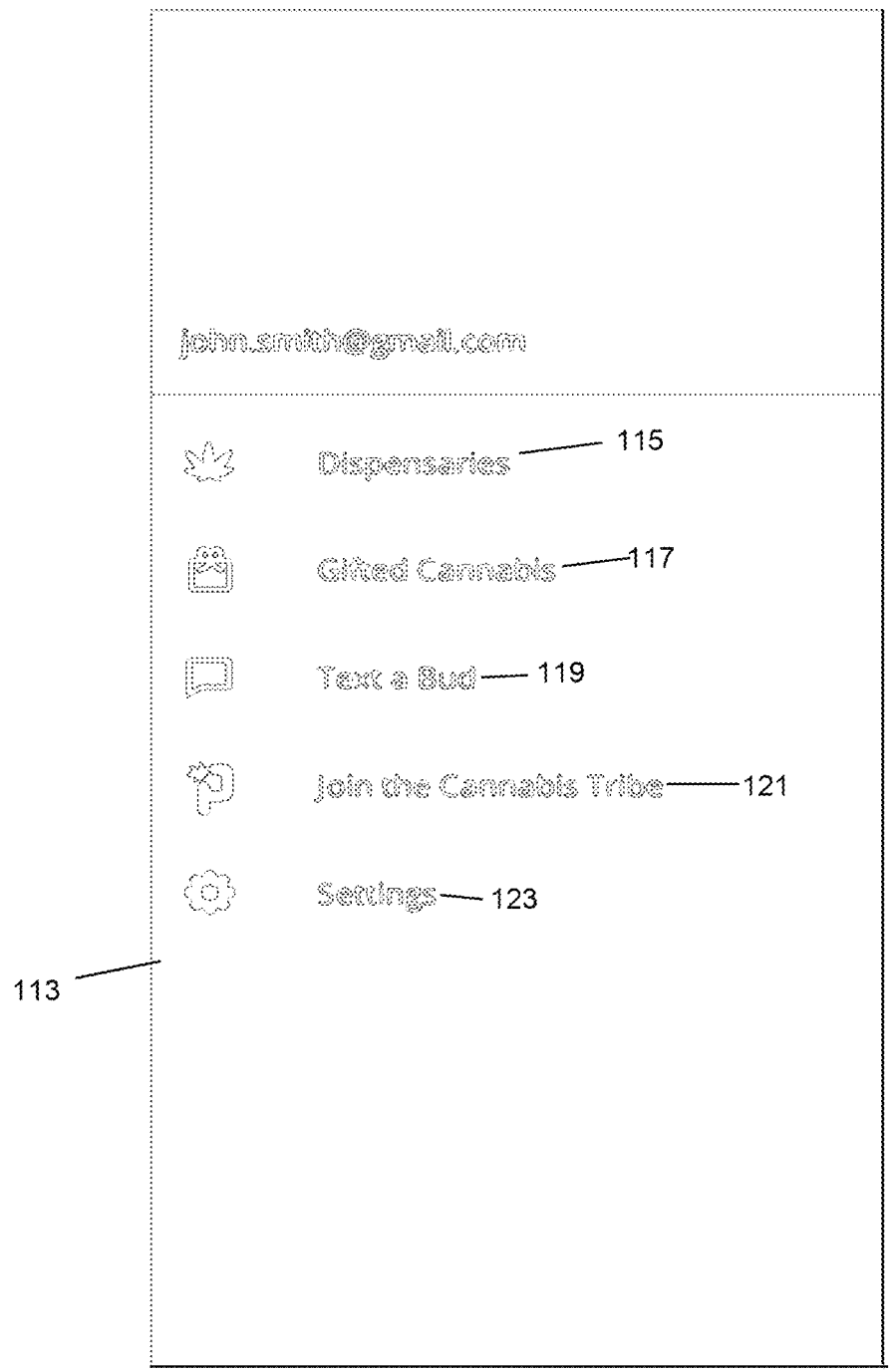
FIG. 2 illustrates an embodiment of a user interface menu on a mobile computing device.

With reference to FIG. 2, the UI 113 of the app can also display a list of different app features in a menu. In this embodiment, the first app feature is "Dispensaries" 115 with the leaf icon. If this feature is selected, the UI will display a list of member dispensaries that can be sorted by name, address, proximity. The second app feature can be "Gifted Cannabis" 117 with a gift icon. If this feature is selected, the UI can list the user's claimed and unclaimed cannabis credits. The third feature is "Text-A-Bud" 119 with a text message icon. If this feature is selected, the app opens a screen that allows user to text or email cannabis credit to one of their contacts. The fourth feature is "Join the Cannabis Tribe" 121 with the PuffPass logo icon. If this feature is selected, the UI opens to the Cannabis Tribe membership sign up page. The fifth illustrated feature is "Settings" 123 with a gear icon. Selecting this feature allows users to control the functional setting for the app and their account.

Figure 3:
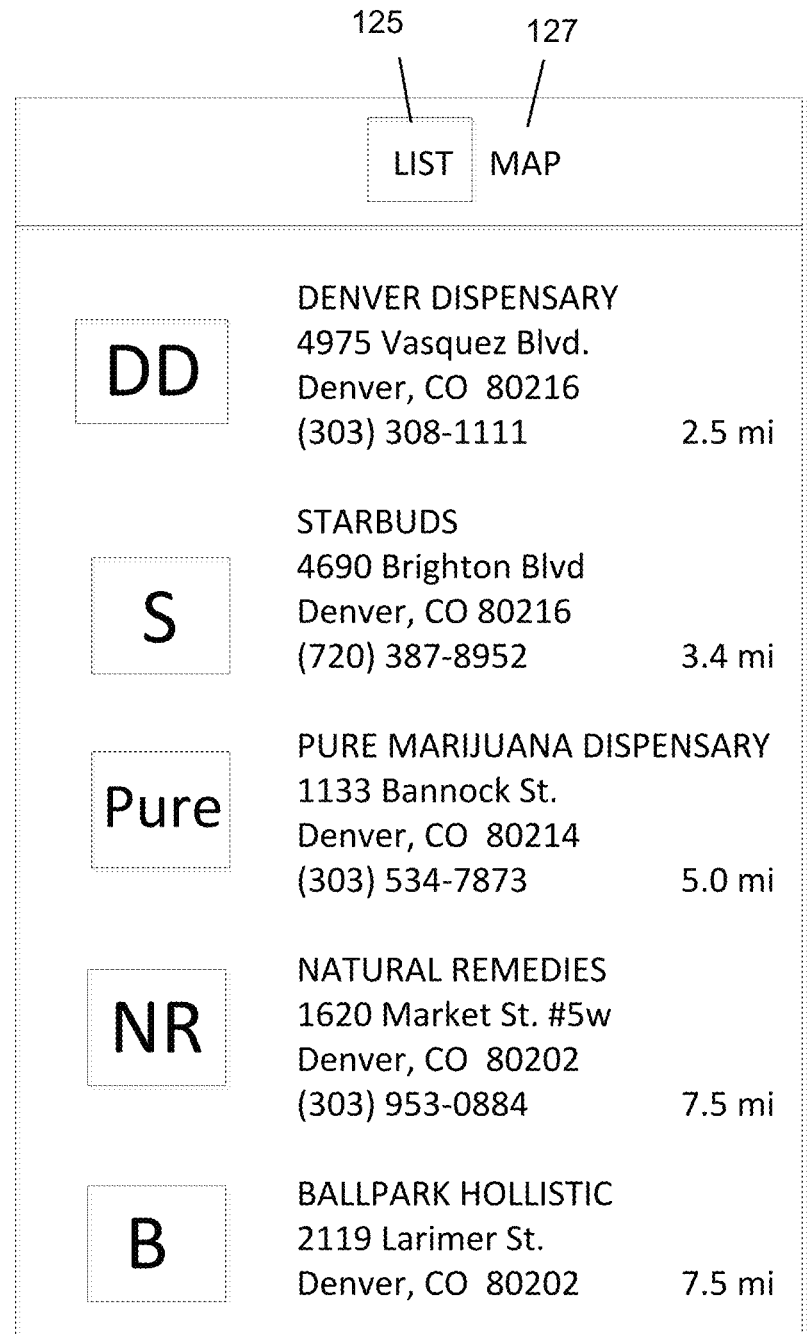
FIG. 3 illustrates an embodiment of a user interface menu on a mobile computing device.

If the user clicks the "Dispensaries" button, the computing device location information can be transmitted to a system server. The server can respond by transmitting the member dispensaries in the vicinity of the computing device. With reference to FIG. 3, the dispensary information can be displayed on the user interface that are close to the mobile computing device. In this embodiment the user has selected the "list" button 125 and the dispensaries are displayed in a list format and organized based upon the distance from the mobile computing device. In this embodiment, the displayed dispensary information includes: the names, addresses, phone numbers, and distances from the mobile computing device. The member dispensaries can include dispensaries, which are in the system database which have agreed to participate in the PuffPass program. The user can click on the map button 127 to cause the user interface to display a map of the area around the mobile computing device with the locations of the dispensaries indicated on the map.

Figure 4:
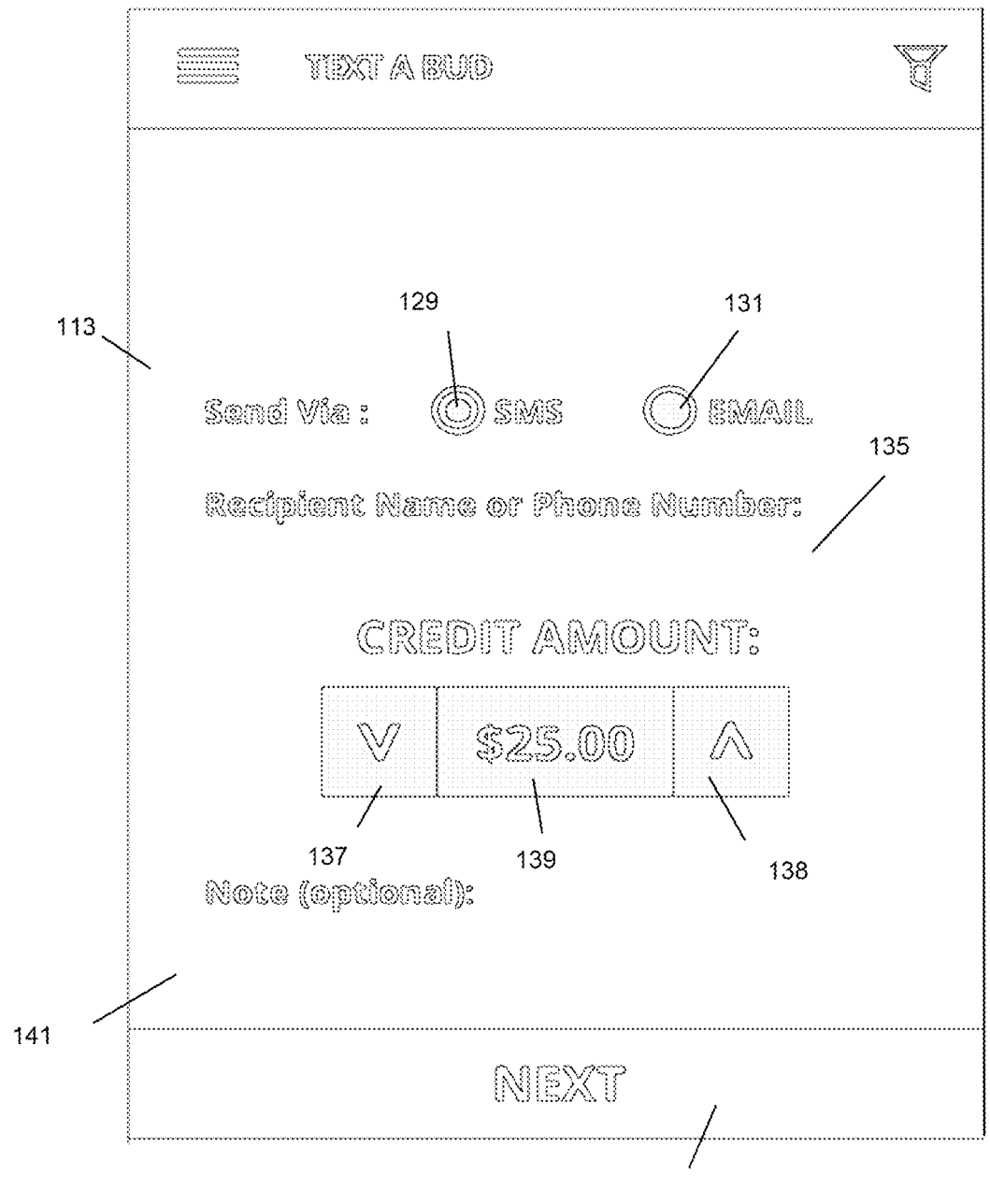
FIG. 4 illustrates an embodiment of a recipient and credit input on a computing device.

With reference to FIG. 4, if user clicks on Text-A-Bud, the UI 113 can display the Text-A-Bud screen 127. The user can decide how to transmit the cannabis credit.

In this embodiment, the user can text via SMS button 129 or email the cannabis credit by clicking on the "SMS" or "Email" button 131. The user can then input the recipient's name or phone number in the recipient input 135. The system can search the user's contacts list and display more recipient information so that the user selects the right person. The UI can also allow the user to select the quantity of cannabis to be gifted and sent. In this example, the system can display a credit amount 139 and have an increase button 138 and a decrease button 137 that can be used to adjust the credit amount 139 value. Optionally, the user can input a personalized message in a note area 141, which will be transmitted to the recipient. When the gift information is input, the user can click on the next button 143.

Figure 5:
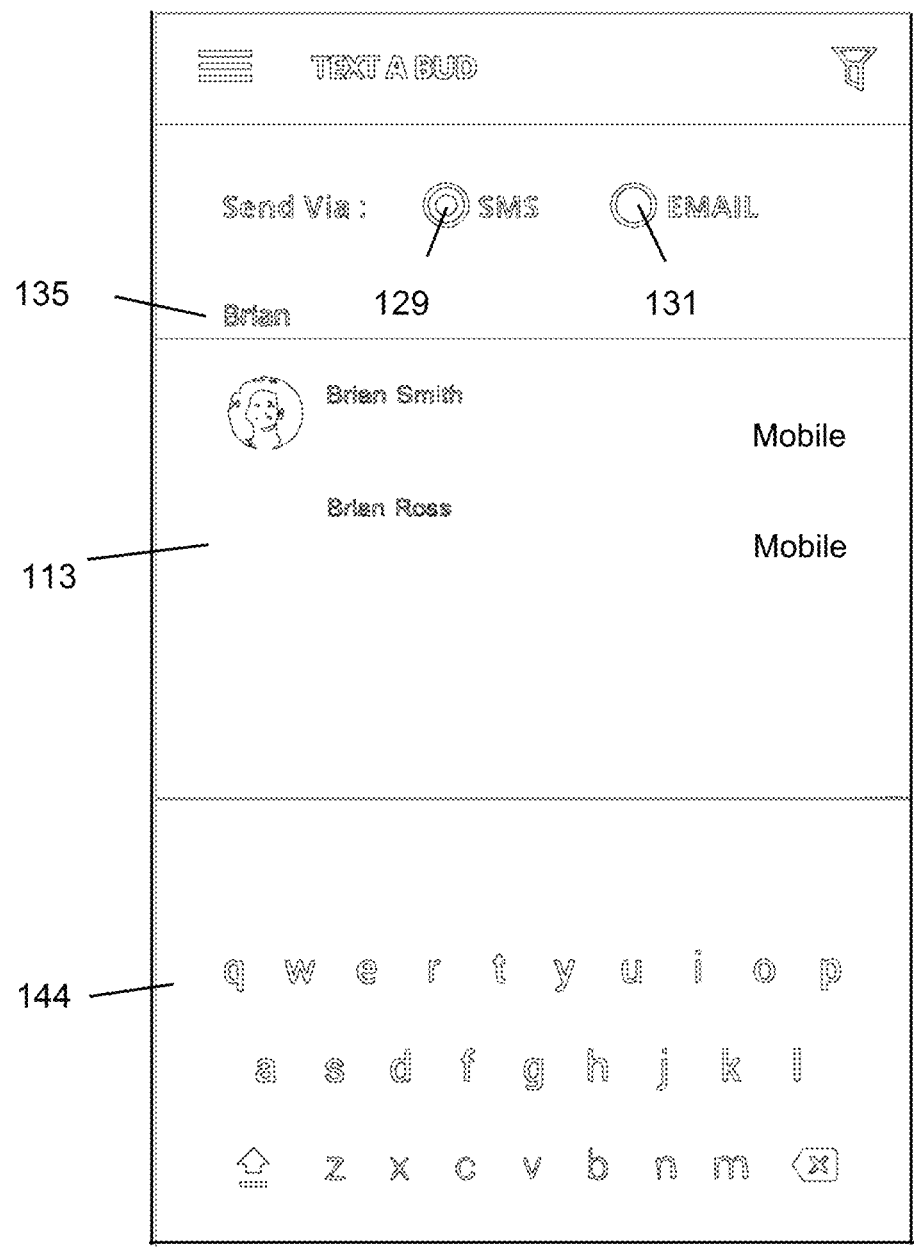
FIG. 5 illustrates an embodiment of a text message input on a mobile computing device.
Figure 6:
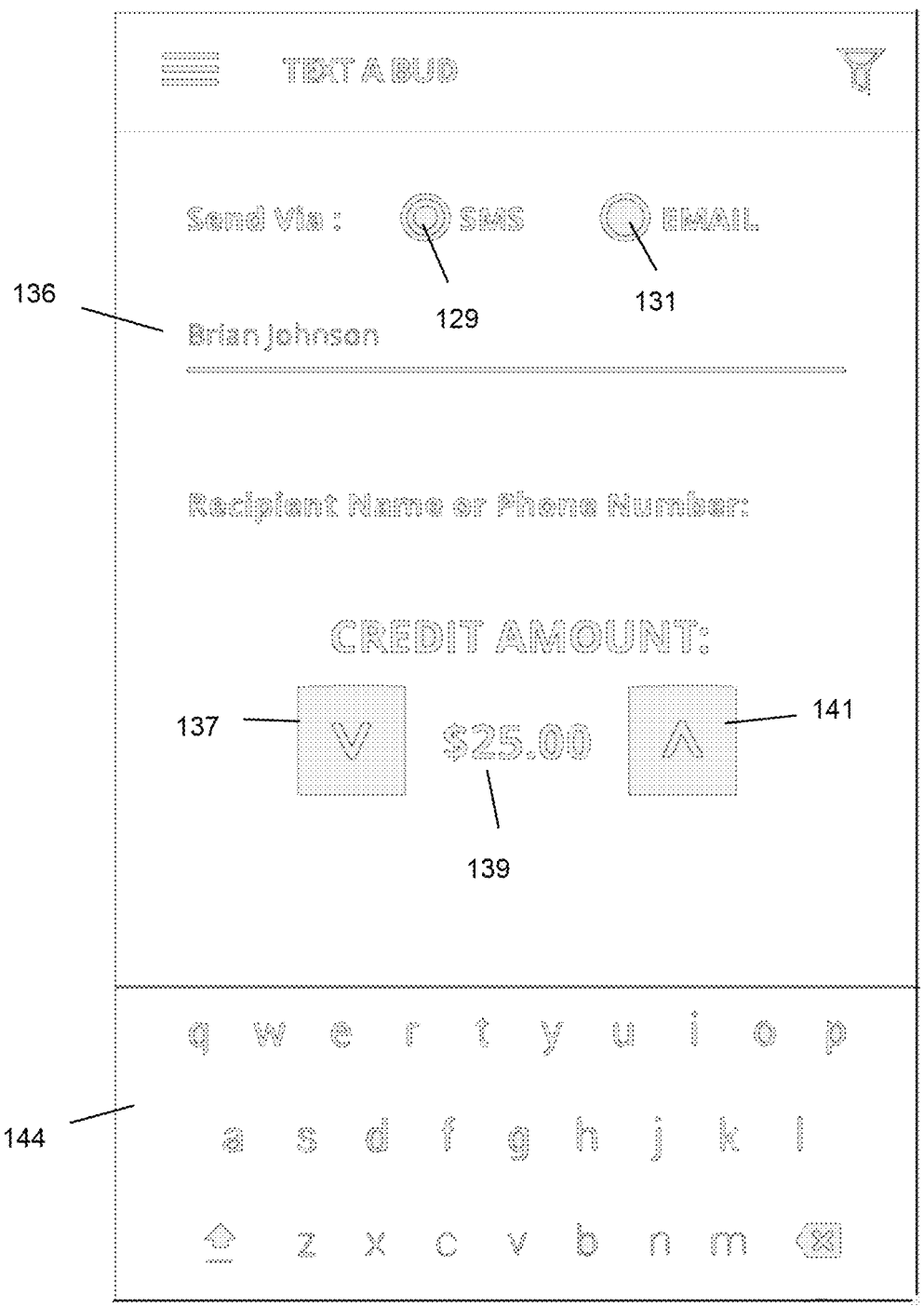
FIG. 6 illustrates an embodiment of a recipient and credit input on a computing device.

With reference to FIG. 5, in an illustrated example, the user has typed in "Brian" 135 via the QWERTY keyboard 144 and the system has searched the contact database on the computing device for all Brians. Information for each of the Brians found in the database are listed on the UI 113. The user can click on the desired Brian to complete the SMS or email gift delivery means. With reference to FIG. 6, the user has selected Brian Johnson as the recipient and SMS 129 as the delivery means for a $25.00 gift credit.

Figure 7:
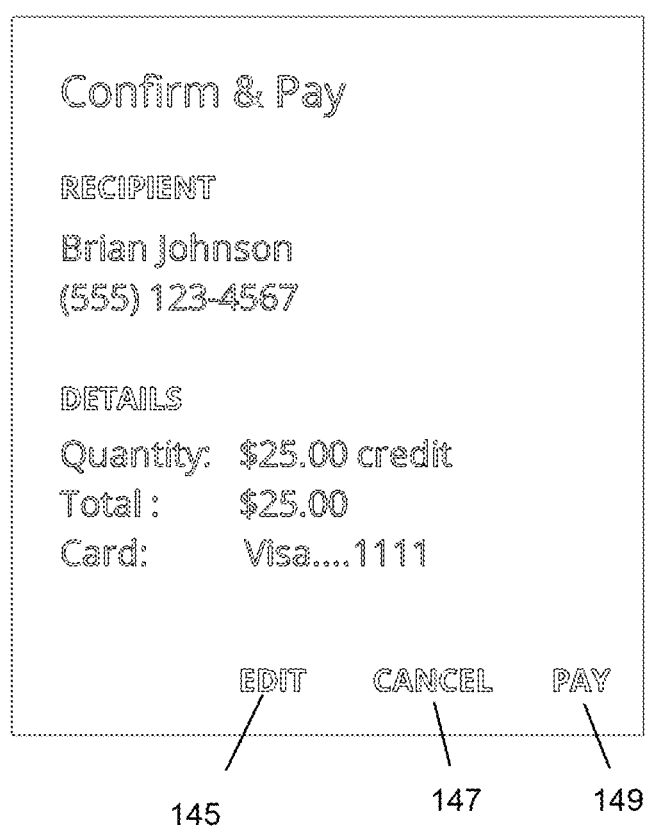
FIG. 7 illustrates an embodiment of a recipient and credit confirmation page on a computing device.

Once the recipient is chosen, the system can display a gift confirmation page. With reference to FIG. 7, a "confirm & pay" dialog box can be displayed by the UI that allows user to review details of the transaction—recipient name and delivery email/phone number, number of cannabis credit amount, total payment amount, and payment method and credit card number. If anything needs to be changed, the user can click the edit button 145 in this example. The system will then go back to the information input page(s) to allow the gift order to be corrected. Once the user has reviewed the details, they click the pay button 149 to finalize the transaction and send the cannabis credit to the recipient or the cancel button 147 to cancel the gift cannabis purchase.

Figure 8:
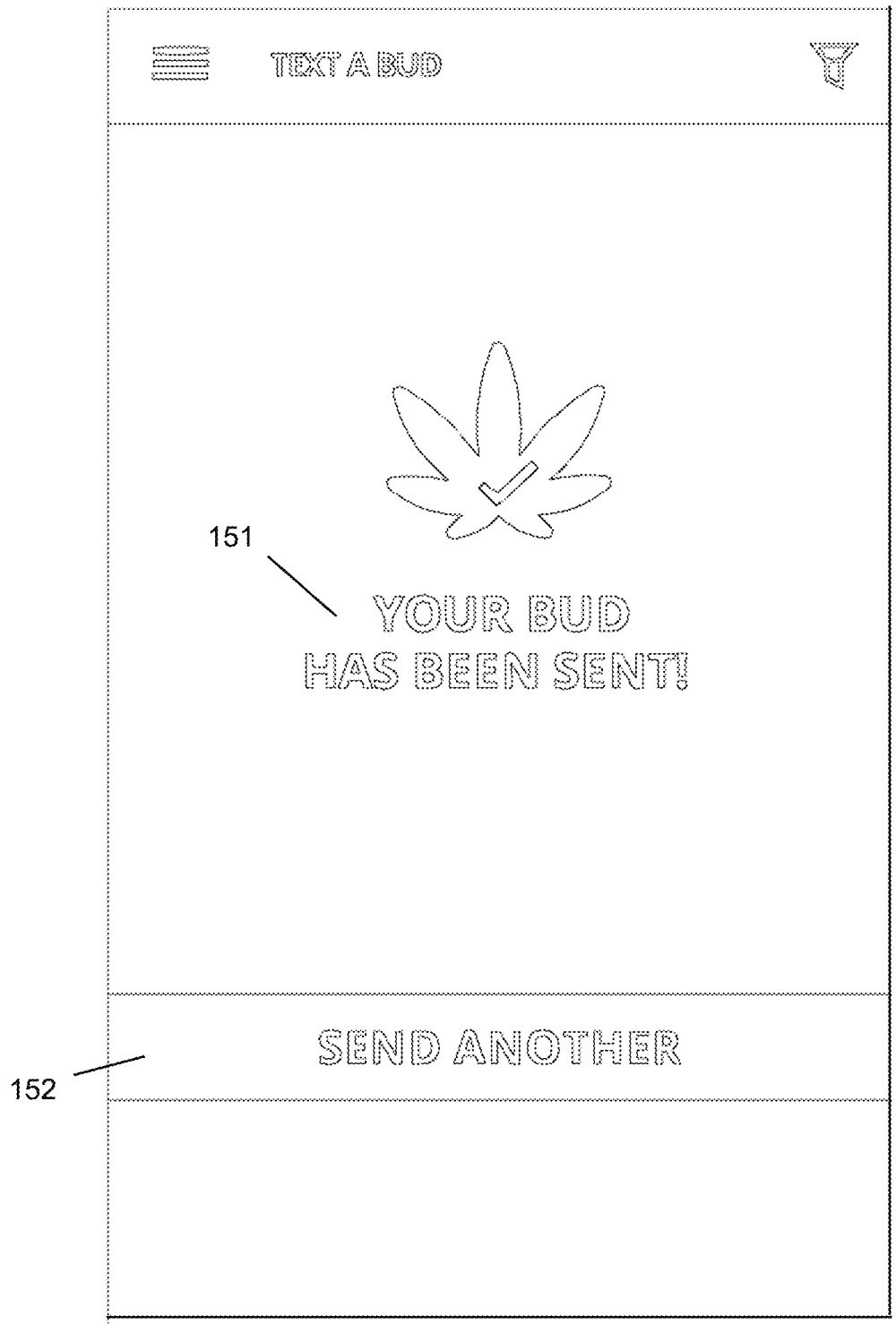
FIG. 8 illustrates an embodiment of a screen shot of a mobile computing device showing gift transmitted confirmation.

With reference to FIG. 8, once payment is confirmed, a confirmation screen is displayed showing a message 151 that the cannabis credit was successfully sent and providing the option of sending another cannabis credit. If the user clicks on the "send another" button 152, the UI can repeat the described Text-A-Bud process.

The server receives the order and transmits an email or text message to the designate recipient with a generic PuffPass message and optionally the personalized message from the sender. The server also billed the sender by the selected purchase means. The server can also apply a cannabis credit to the recipient's account in the system user database and also record the gift purchase in the sender's account.

Figure 9:
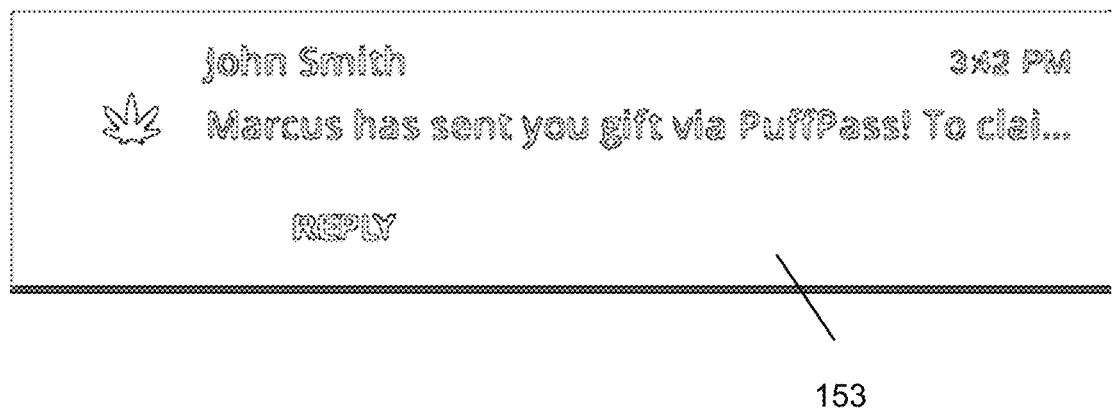
FIG. 9 illustrates an embodiment of a screen shot of a gift recipient mobile computing device showing gift notification.

With reference to FIG. 9, the computing device of the recipient receives a text or email (depending on which option was selected by the sender) message 153 alerting them that the sender has sent them a cannabis credit via PuffPass. The message also explains to the recipient how to claim their cannabis gift. In this example, the recipient is John Smith and the generic message states, "Marcus has sent you a gift via PuffPass! To claim . . . " The message also allows the recipient to reply immediately by pressing the "Reply" button so that the recipient can send a reply text to the sender.

Figure 10:
FIG. 10 illustrates an embodiment of a screen shot of a mobile computing device showing unclaimed gifts, claimed gifts and gifts given.
Figure 10:
Figure 10:
Figure 10:
Figure 10:
Figure 10:

As discussed above with reference to FIG. 3, the system menu allows a user to check their Gifted Cannabis. With reference to FIG. 10, the UI of a system user's computing device can show the "gifted cannabis" screen, which can list and show who gifted the cannabis credit and the redemption status of those cannabis credits. In this example, the "Unclaimed Cannabis" include $15 from Marcus Jones on Tuesday, Mar. 13, 2016, $50 from Alicia Orwell. The UI can also show the claimed cannabis credit. In this example, the "Claimed Cannabis" include $10 from Mary Stevens on Monday Dec. 20, 2015. When the cannabis gift is claimed, the status changes from unclaimed to claimed. The user interface also displays the user's gifted cannabis which includes a $25 gift to Brian Jonson on Apr. 20, 2016.

Figure 11:
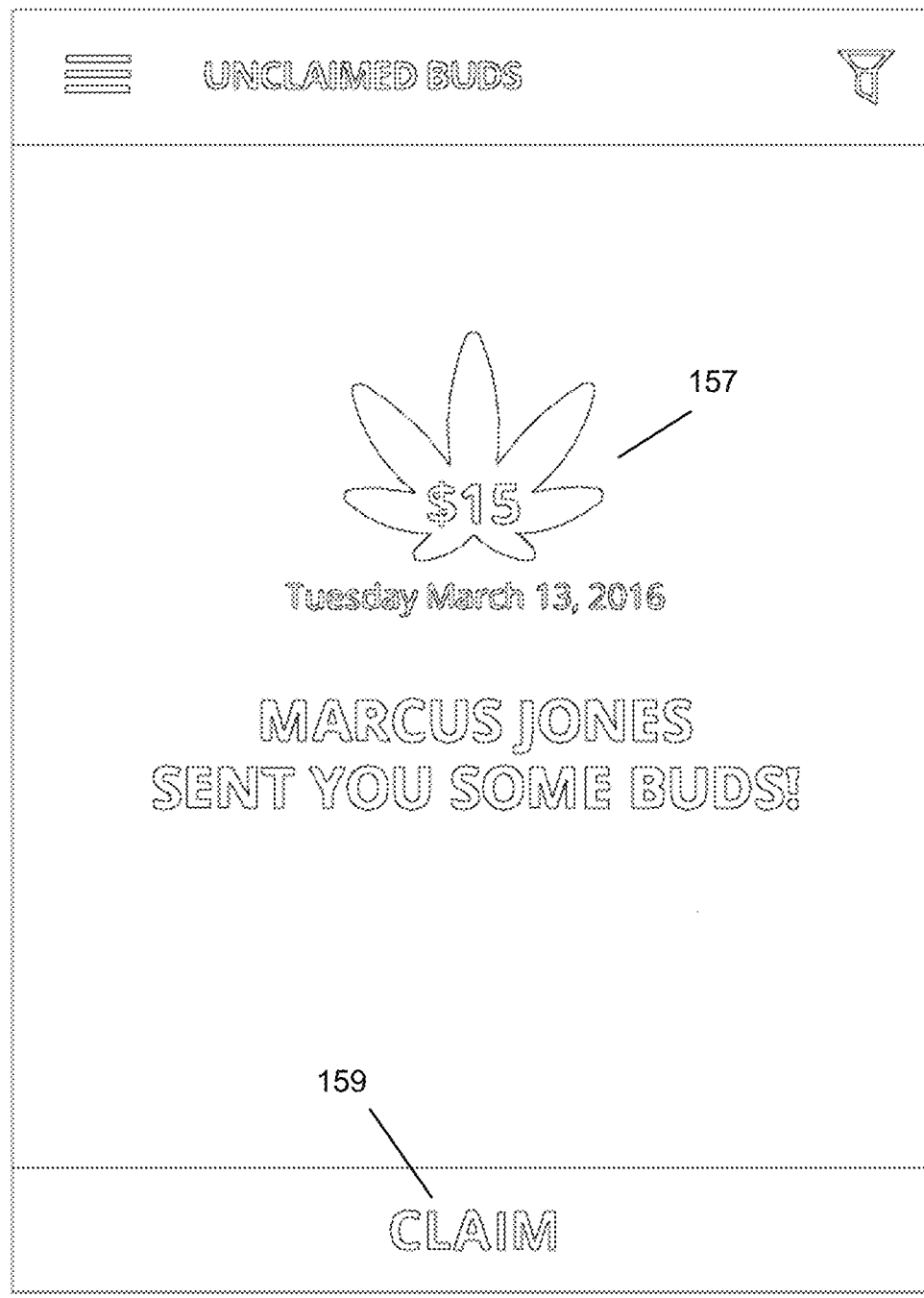
FIG. 11 illustrates an embodiment of a screen shot of a gift recipient mobile computing device showing gift notification.

With reference to FIG. 11, the UI can display a gift detail message 157 when user clicks on one of their unclaimed gifts of cannabis. The gift detail message 157 can show when the cannabis credit was gifted, who sent it, and allows the user the option to claim it at that point. The user can then click on the "claim" button 159 to redeem the cannabis credit.

Figure 12:
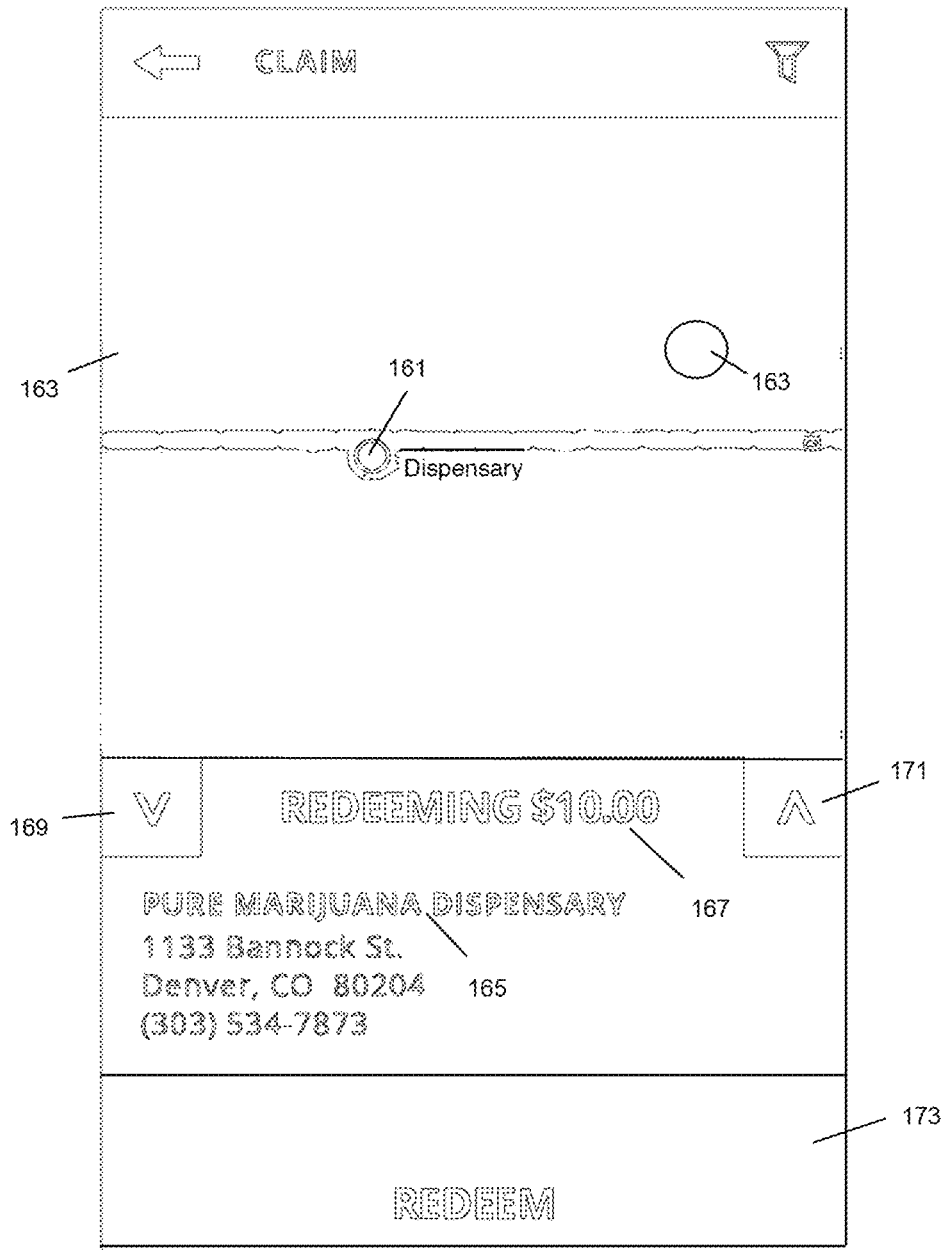
FIG. 12 illustrates an embodiment of a screen shot of a mobile computing device showing a map of participating dispensaries.

With reference to FIG. 12, when "claim" button is clicked, a map 163 showing the user's location as a circle 161 and the nearby member dispensaries 163 locations displayed. The user can then choose which dispensary in the area they would like to redeem their cannabis credit at. In this example, there is only one dispensary listed near the user. However, in other examples, multiple retailers or dispensaries can be displayed. The user can select the desired cannabis credit redemption venue 165 which can be displayed as Pure Marijuana Dispensary. The user can then select the amount of the available gifts to redeem. In this example, the user is redeeming $10 value 167 which is displayed on the user interface. The system can have controls such as an increase button 171 and a decrease button 169 to adjust the redeemed value 167. When the user decides to redeem, the redeem button 173 can be pressed.

Figure 13:
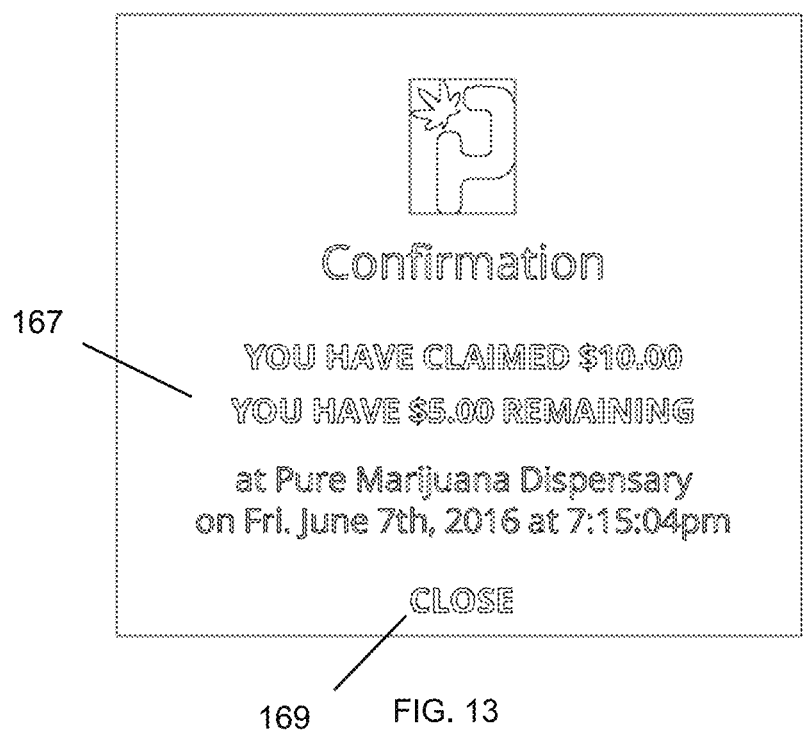
FIG. 13 illustrates an embodiment of a screen shot of a mobile computing device showing a gift redemption screen.

With reference to FIG. 13, once a user chooses a user has redeemed their cannabis credit, a confirmation box 167 is displayed on the UI of the user's computing device showing that the cannabis credit was successfully redeemed and how many remaining cannabis credits the user has. In an embodiment, the confirmation box will also display the name of the user redeeming the cannabis credit, a time and date stamp, and an icon in motion. This information on the UI can be shown to the establishment employee to claim the cannabis credit from the dispensary. These validation measures will indicate to the employee that the redemption screen UI is not a screenshot from a previous cannabis credit redemption. In this example, the user has claimed 1 cannabis gift of $10 and has $5 of unclaimed cannabis credit remaining. The user can click the close button 169 to exit this UI screen.

Cannabis gifts can be transmitted from a first mobile computing device to a second mobile computing device that run an application program. The mobile computing devices communicate with a server and data for the system users is stored on a database. When cannabis products are gifted, a unique token generated by the server and a gift message is transmitted to the second mobile computing device. The user can go to a cannabis provider and redeem the gift credit by showing the user interface to a staff member of the cannabis provider. The server can record the unique token for the cannabis gift as being used and records the value of the cannabis gift with the food or beverage provider. The server forwards payment for the value of the cannabis gift to the cannabis provider. The server database can store all user and token information including: user identification numbers which can be phone numbers, token gift credits received, token gift credits gifted, account fund receipt information to purchase the gifts and payment information to the cannabis providers.

In other embodiments, the inventive system can provide other security features to insure that dispensaries are only giving user validated unclaimed gifts of cannabis credit. These systems can provide more complex validation measures. In these embodiments, the server can transmit a unique bar code token to the computing device of the user who is redeeming a cannabis credit. A user can click on a bar code button on the confirmation screen that will bring up a bar code that the establishment employee scans at the P.O.S. system. This bar code can be transmitted to the server that will validate the bar code on the server to ensure that the cannabis credit has not been previously used or claimed. If the bar code has been previously redeemed, the employee can transmit an error message indicating that the bar code is not valid and the cannabis redemption transaction can be invalidated or stopped.

In an embodiment, the system server transmits deep links in the gift message that has associated the phone to a unique token, which can be a server generated digital code. This token is active until the redemption slider has been activated/redeemed. In an embodiment, the server can read the token data and transmit the token data to the server, which verifies the validity of the token. If the token is valid, the server can validate the cannabis purchase and complete the transaction. Once the redemption of the credit token has been completed on the user's mobile computing device the unique token is no longer valid for its intended purpose.

Using the described system and method, the server can account for the gift of cannabis credit that have been claimed and update the unclaimed gifts of cannabis credit. When cannabis credits are claimed, the system can update the user's account stored in the user database and transmit an accounting of the claimed and unclaimed gifts of cannabis credits to the UI on the user's computing device. In an embodiment, the user may also update the gift sender's account so that the sender will know that the gifted cannabis credit has been redeemed. In yet another embodiment, the system can prompt the user to send a note to the gift sender when the gifted cannabis credit has been redeemed.

Figure 14:
FIG. 14 illustrates an embodiment of a screen shot of a table listing dispensaries by the mobile computing devices.

As discussed above with reference to FIG. 3, the system menu allows a user to see the list of participant retailers and dispensaries. With reference to FIG. 14, an exemplary listing of dispensaries around the user's location can be displayed in order of distance from a mobile computing device. Each listing can include an address and phone number. Alternatively, the dispensaries can be displayed in any other order such as alphabetical or dispensary rating or favorite dispensary based upon prior gift redemptions. The server can include a database of locations and dispensaries that can include logos. In the illustrated example, the logos for Denver Dispensary and Natural Remedies are displayed. If a logo is not in the server database, the first letter or number for the establishments can be displayed.

Figure 15:
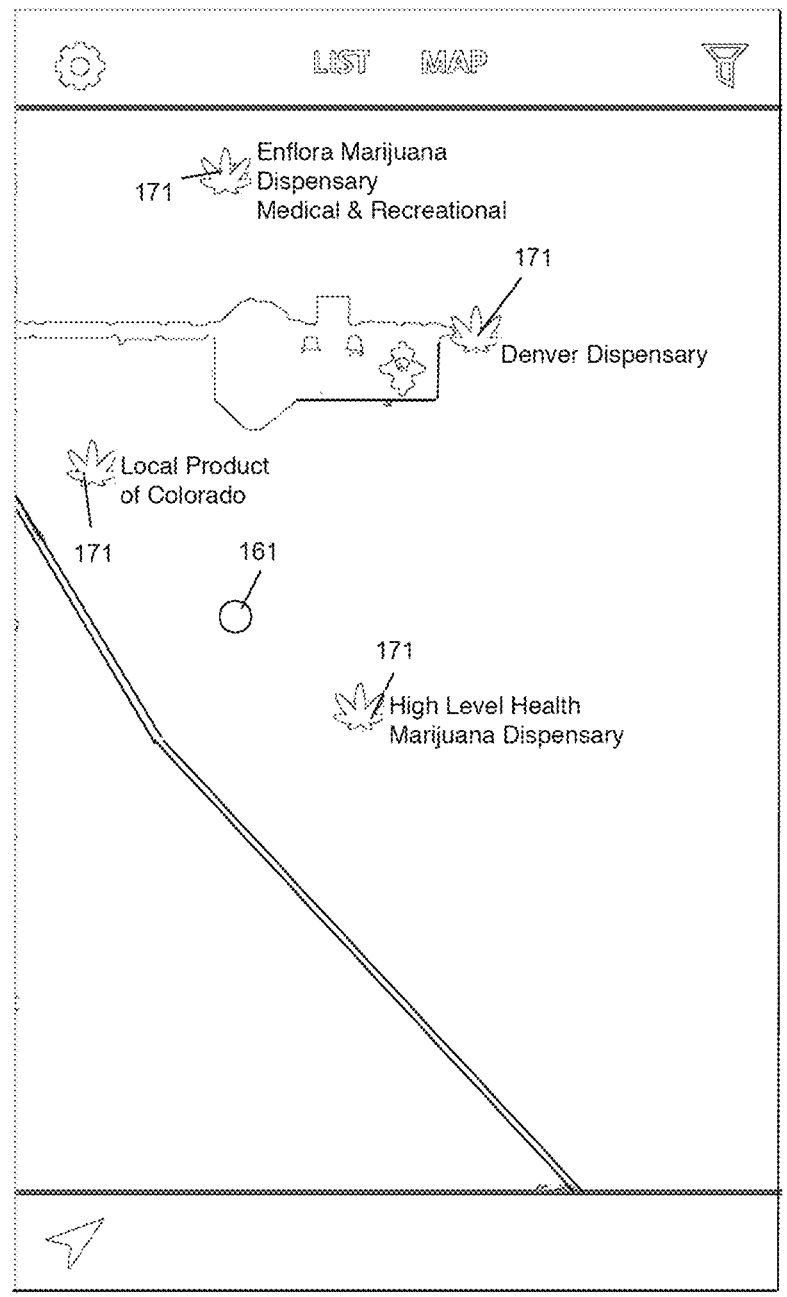
FIG. 15 illustrates an embodiment of a screen shot of a mobile computing device showing a map of participating dispensaries.
Figure 16:
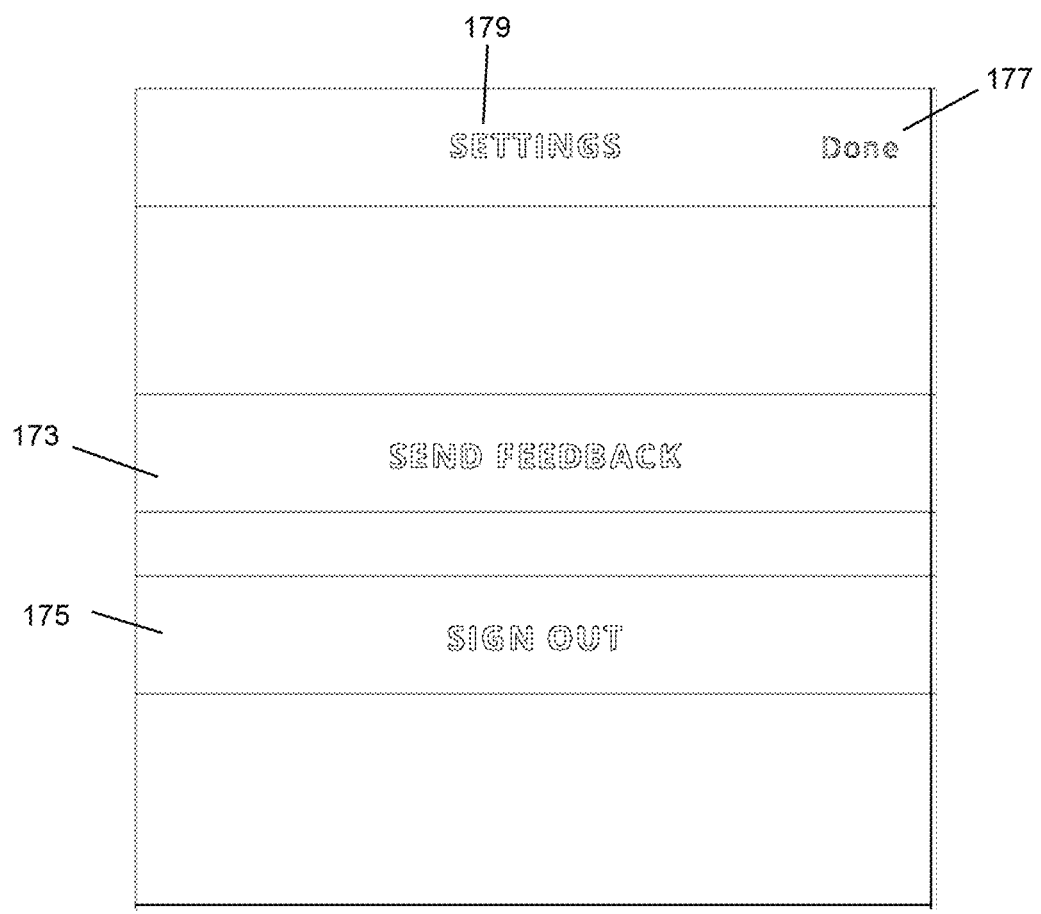
FIG. 16 illustrates an embodiment of a feedback and sign out page.

With reference to FIG. 15, the UI can also display a map view showing a user's location as a circle 161 in this example and nearby retailers shown as red leaves and dispensaries shown as leaves 171. This can be useful in determining the locations or directions to destination dispensaries or retailers. As discussed above with reference to FIG. 3, the system menu allows a user to change the system settings. With reference to FIG. 16 a simple example of a settings page is illustrated. The user can input text or voice feedback and then click on the "SEND FEEDBACK" button 173 to write and send feedback to the system administrator. The user can click the done button 177 to go back to other system functions or press the "SIGN OUT" button 175 to stop using the app and conserve the computing device's processing resources.

In other embodiments, pressing the settings button 179 can provide the user with access to additional app control settings. For example, if a user has specific preferred dispensary, the system can only list the preferred dispensaries. Alternatively, the system can be configured in the settings to display dispensaries in close proximity to the user's home rather than current location.

PuffPass Membership:

In an embodiment, PuffPass is a hyper-local & hyper-focused free phone/web application with an optional paid monthly or annual membership. The program aggregates cannabis retailers and dispensaries, but takes the unique approach of getting competing dispensaries to link arms on a common loyalty, discount, and info-sharing platform, that is the PuffPass Membership. A PuffPass Membership is unique in that it offers discounts for cannabis users from dispensaries and the local retailers that support legal cannabis use. Unlike discounts from singular dispensaries or retailers, a PuffPass Membership offers discounts at all PuffPass member dispensaries and retailers in the U.S. with a single membership.

Figure 17:
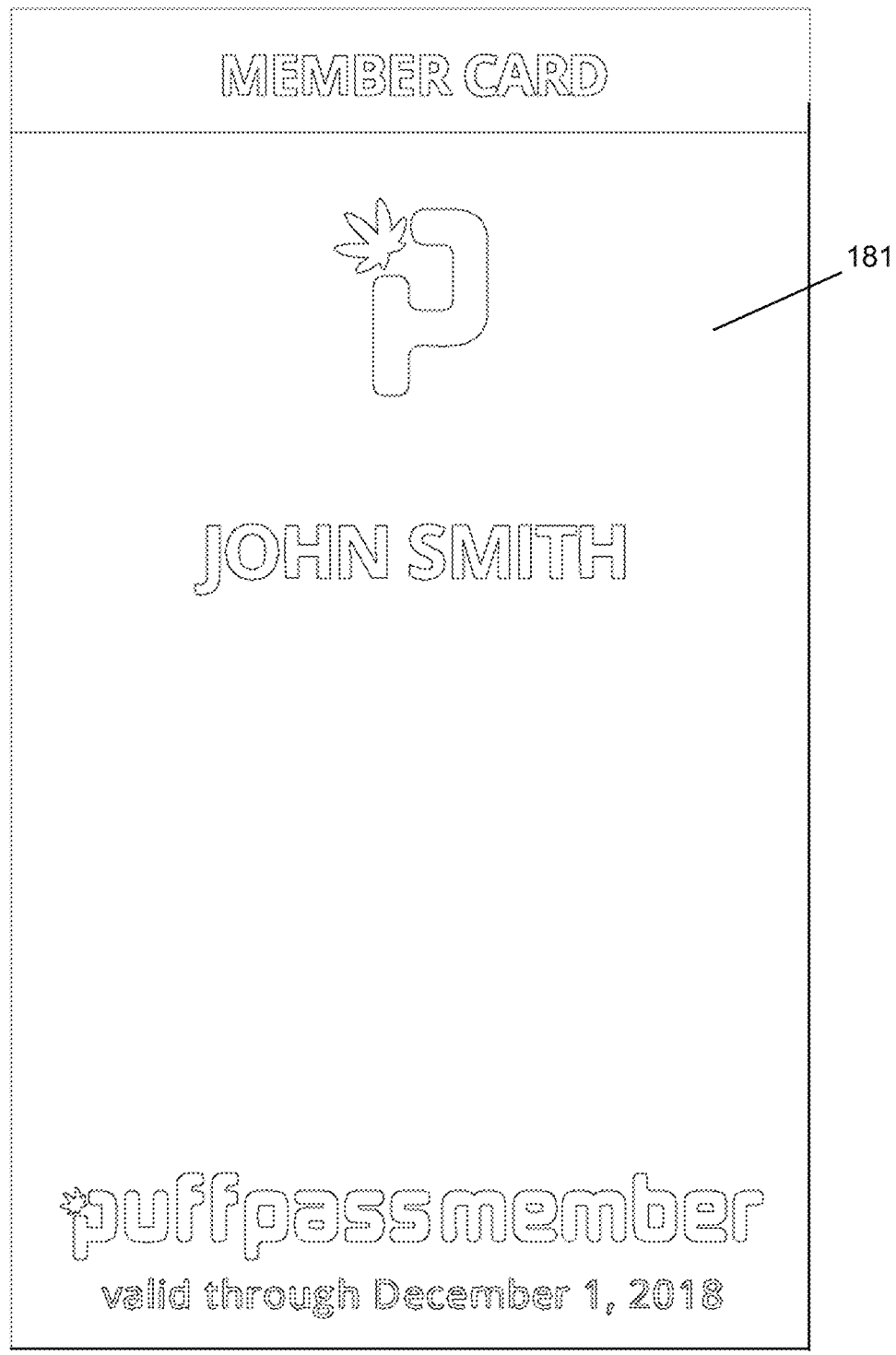
FIG. 17 illustrates an embodiment of a gift program membership page.

FIG. 17 illustrates an example of a user's digital membership card 181 displayed on a mobile computing device such as a smart phone. The user displays their membership card at member dispensaries and retailers to receive member discounts. In this case the member is "John Smith" and the PuffPass membership is valid through Dec. 1, 2018.

Figure 18:
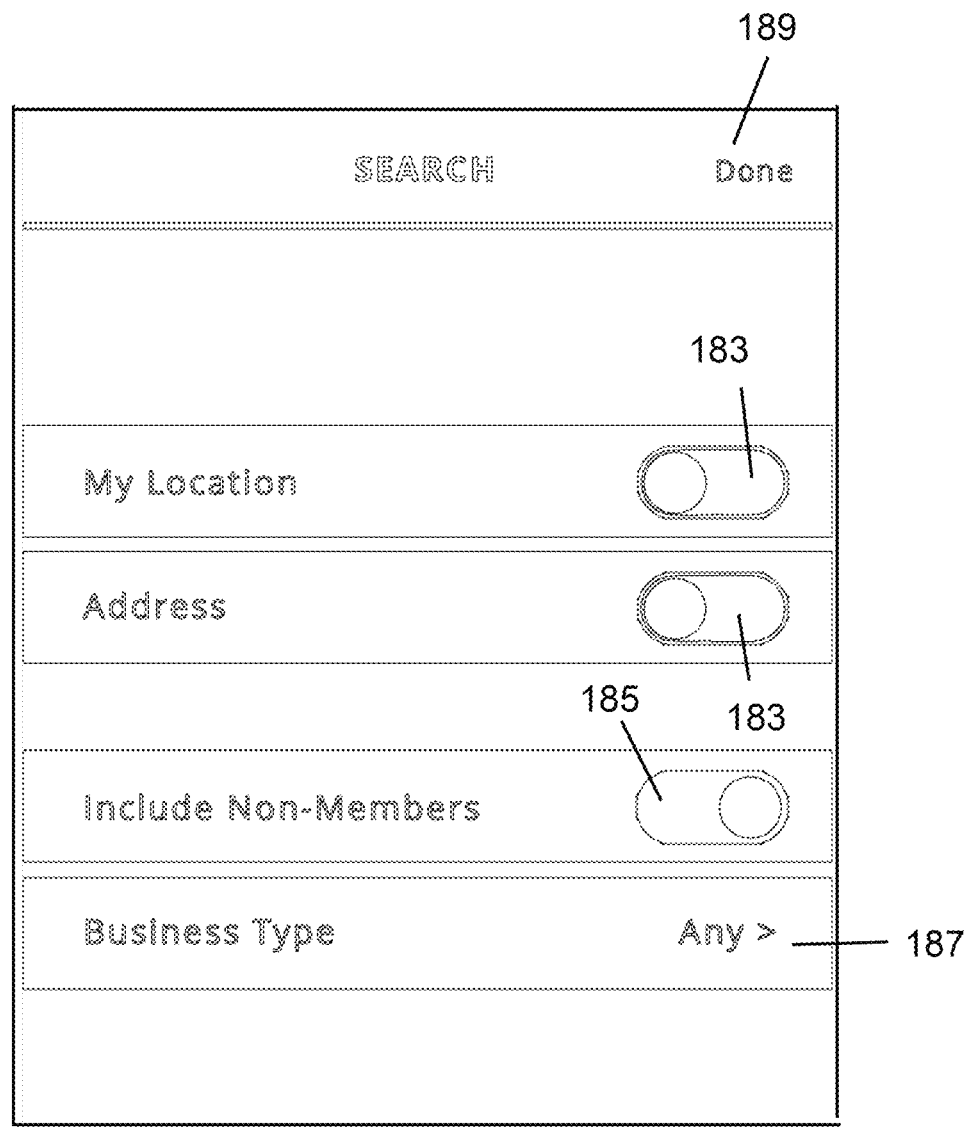
FIG. 18 illustrates an embodiment of a gift program merchant search page.

In an embodiment, the system can display the search results for dispensaries and retailers based upon UI settings configured in FIG. 18. In this example, a search settings page allows users to search for a dispensaries based on their address or to sort the dispensary list by proximity or alphabetically. In this example, the search function can be based upon a user location and/or address. The UI can include buttons 183 which allow the system to actuate or deactivate the location and address search basis. The search results can be set up to include non-member establishments with the non-member button 185. However, the PuffPass may not be accepted for membership discounts at these establishments. "Business type" button can be a menu of different types of establishments such as: dispensary, retailer, etc. The user can click on the type button 187 to select the type of business to be searched. When the user finishes configuring the search settings, the done button 189 can be pressed to return to other system menus.

Figure 19:
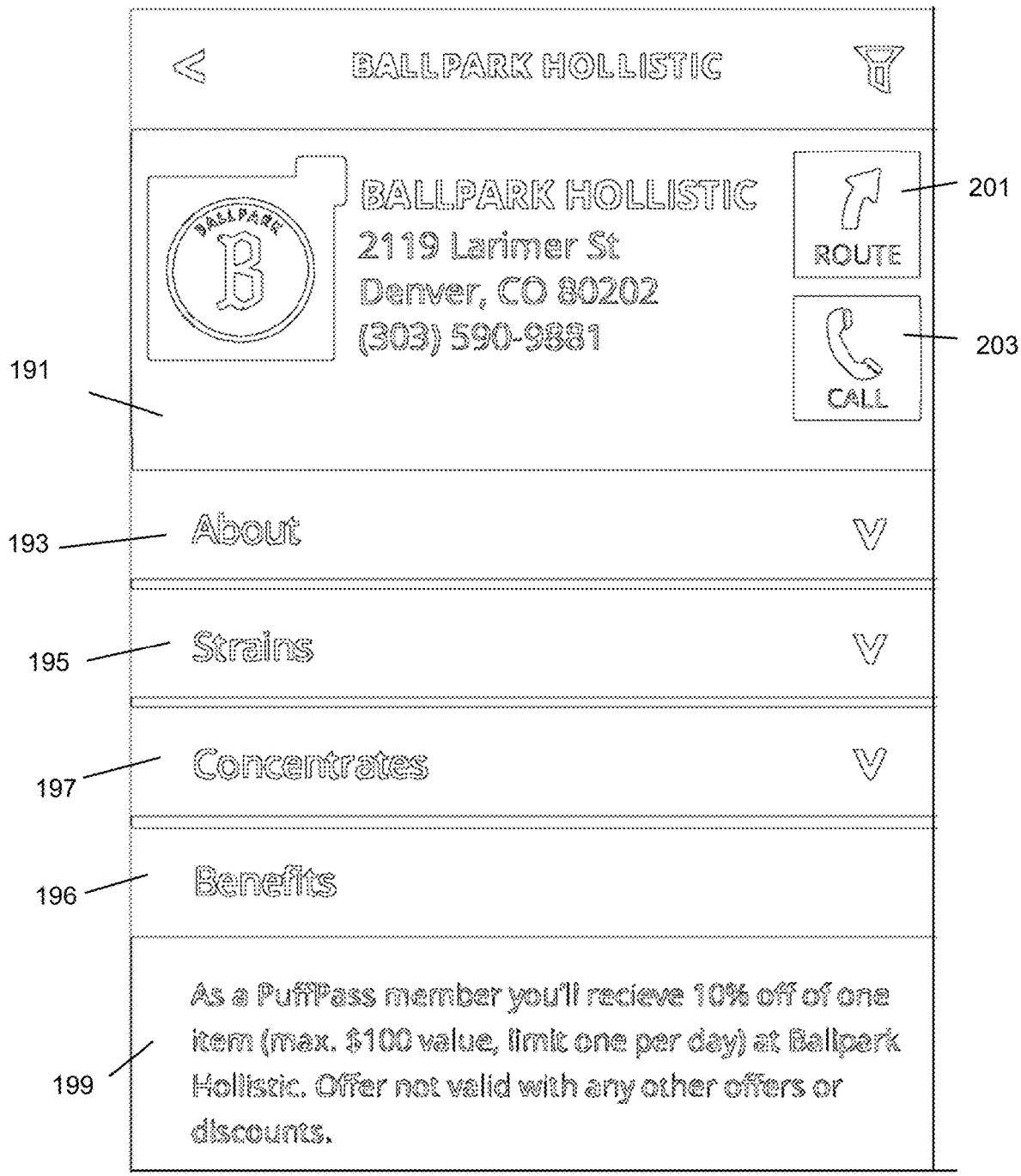
FIG. 19 illustrates an embodiment of a gift program merchant information page.

As discussed, the UI can list dispensaries, retailers, or other related establishments. The server database can include various information about each of the dispensary, which can be accessed by the system users. When a user clicks on a member dispensary in the dispensary list, they see the dispensary's information screen. For example, with reference to FIG. 19 a user has selected "Ballpark Hollistic Dispensary" and the UI can display a home page 191 for a member dispensary. The UI can also have a route button 201 to get directions to the dispensary and a call button 203, which causes the computing device (such as a smart phone or VOIP) to call the dispensary. The user can click on the About button 191 to see information about the dispensary. The user can click on the strains button 195 to display a cannabis strains list and/or the concentrates button 197 to display information about the concentrates of the cannabis available at the dispensary.

The page can also have a Benefits button 196. When pressed, the UI can display member benefits such as dispensary offers 199. In this example, the PuffPass membership can be used for a 10% off of your first cannabis item purchase of the day per day as well as the term, "not valid with any other offer or discount." In some embodiments, the PuffPass benefits can change based upon the day or date. For example, the dispensary may offer larger discounts on Mondays and smaller discounts on weekends. These changing benefits can be automatically updated and indicated on the system UI.

Figure 20:
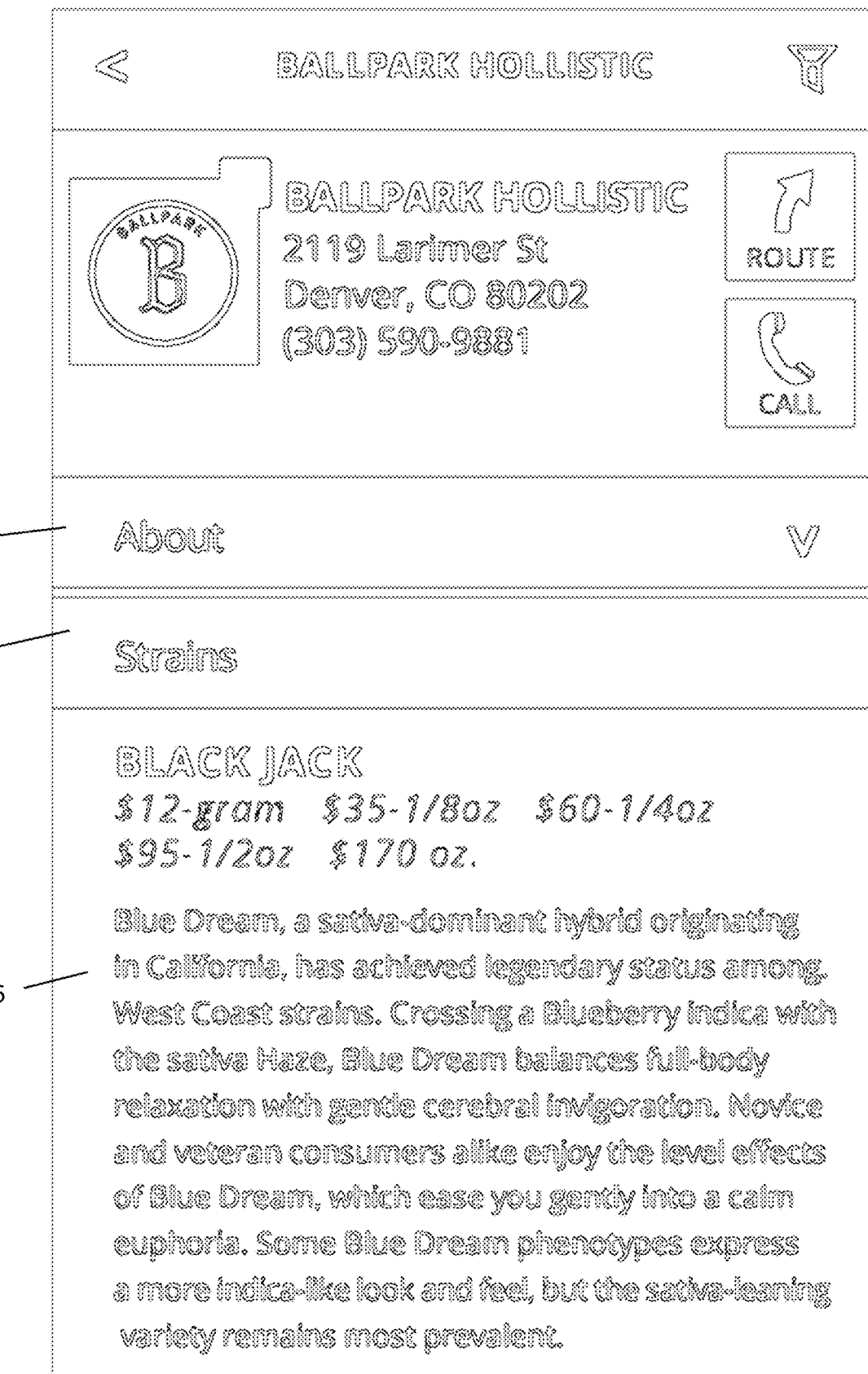
FIGS. 20-22 illustrate embodiments of merchant pages with cannabis information.

With reference to FIG. 20, a user has selected "Ballpark Hollistic Dispensary" and the server has sent Ballpark Hollistic Dispensary information to the user's computing device including address, phone number, directions and call features. In this example additional information for Strains have been clicked and is now displayed. The UI displays the strain information 205 for Black Jack which includes the price and a description of the strain.

Figure 21:
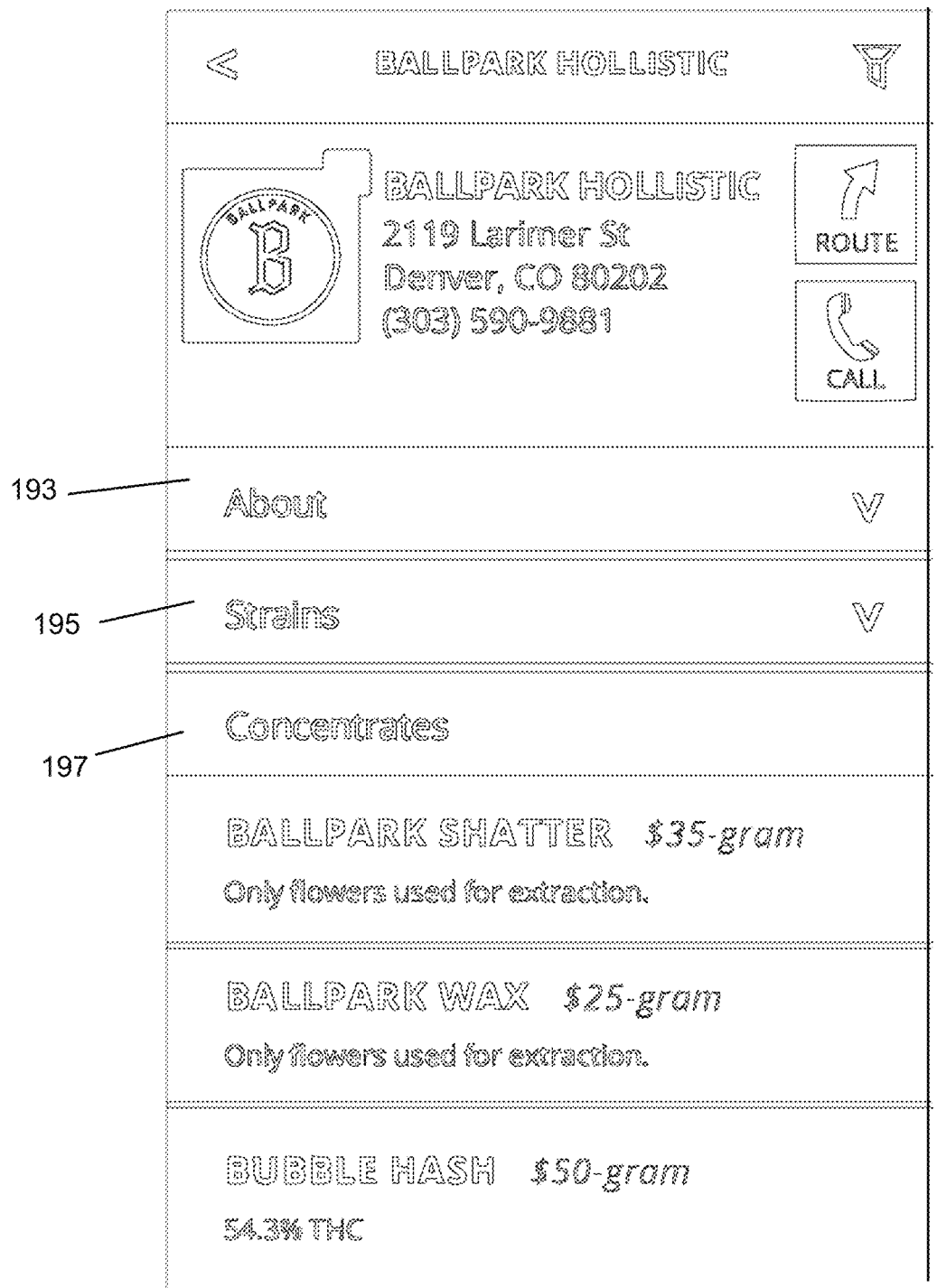

With reference to FIG. 21, the user has pressed the concentrates button 197 and the UI displays concentrate information for various strains including: Ballpark Shatter which only uses flowers for extraction, Ballpark Wax which only uses flowers for extraction and Bubble Hash which is 54.3% tetrahydrocannabinol (THC).

Figure 22:

With reference to FIG. 22, in an embodiment, the UI can include an Edibles button 198. In this example, the user has pressed the edibles button and information about edibles is displayed including BK Cherry Almond Crunch and BK Coffee Crunch.

Figure 23:
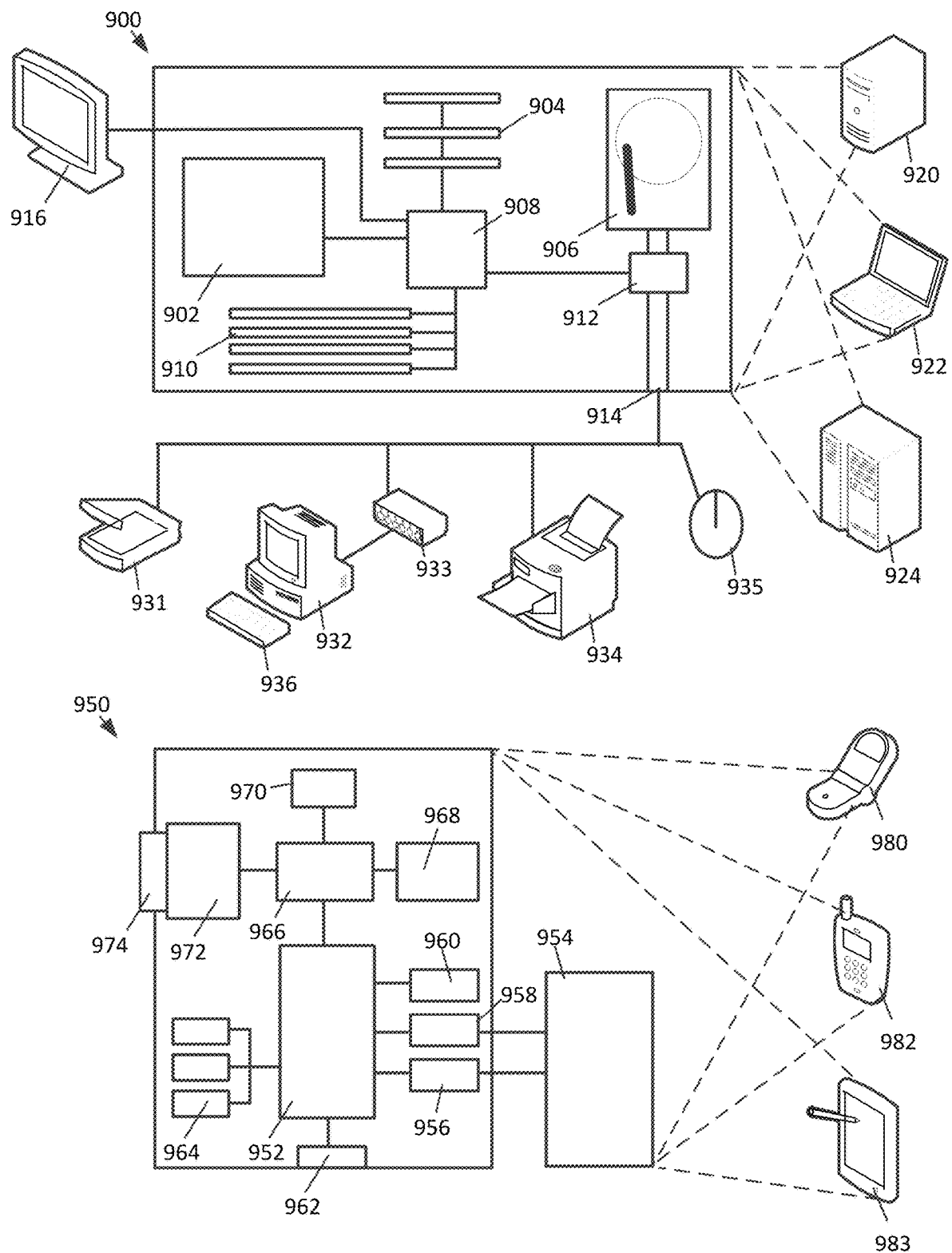
FIG. 23 an example of a generic computer system in communication with a generic mobile computer device.

FIG. 23 shows an example of a generic computer device 900 and a generic mobile computer device 950, which may be used to implement the processes described herein, including the mobile-side and server-side processes for installing a computer program from a mobile device to a computer. The computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components processor 902, memory 904, storage device 906, high-speed interface 908, high-speed expansion ports 910, and low speed interface 912 are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple busses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions are exemplary only. In one implementation, the high-speed controller 908 is coupled to the memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port 914, which may include various communication ports (e.g., USB, Bluetooth, Ethernet, wireless Ethernet), may be coupled to one or more input/output devices, such as a keyboard 936 in communication with a computer 932, a pointing device 935, a scanner 931, or a networking device 933 such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a Microdrive, solid state memory or other device, to provide additional storage. Each of the components computing device 950, processor 952, memory 964, display 954, communication interface 966, and transceiver 968 are interconnected using various busses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provided in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to the device 950 through an expansion interface 972, which may include, for example, a SIMM (Single In Line Memory Module) card interface. Such expansion memory 974 may provide extra storage space for device 950, or may also store applications or other information for the device 950. Specifically, expansion memory 974 may include instructions to carry out or supplement the processes described above, and may include secure information also. Thus, for example, expansion memory 974 may be provided as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, memory on processor 952, or a propagated signal that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, Wi-Fi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, a tablet computer 983 or other similar mobile computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It will be understood that the inventive system has been described with reference to particular embodiments, however additions, deletions and changes could be made to these embodiments without departing from the scope of the inventive system. Although the systems that have been described include various components, it is well understood that these components and the described configuration can be modified and rearranged in various other configurations. For example, while the patent application describes cannabis and dispensaries, this inventive process can be applied to other cannabis related items, products, and services.

What is claimed is:

1. A cannabis gifting method comprising:
   providing a server coupled to a network, a database and a plurality of mobile computing devices, wherein the plurality of mobile computing devices are in communication with the server through the network;
   downloading an client application program to each of the plurality of mobile computing devices;
   storing by the database, data for each of a plurality of users comprising: cannabis gifts, cannabis gifts available, and cannabis gifts claimed;
   receiving by the server from a first mobile computing device, a first cannabis gift from a first user to a second user;
   storing the first cannabis gift as one of the cannabis gifts that have been gifted for the first user and storing the first cannabis gift as one of the available cannabis gifts for the second user in the database;
   generating a first unique code by the server for the first cannabis gift;
   recording the first unique code for the first cannabis gift in the database;
   transmitting the first unique code and the first cannabis gift to a second mobile computing device by the server;
   displaying the first cannabis gift on the second mobile computing device;
   displaying a map showing locations of cannabis suppliers on the user interface (UI) of the second mobile computing device;
   selecting one of the cannabis suppliers on the UI of the second mobile computing device;
   displaying a name, address, and phone number of the one of the cannabis suppliers selected on the UI of the second mobile computing device;
   inputting a redemption value on the UI of the second mobile computing device;
   clicking on a claim button on the UI to redeem the redemption value from the first cannabis gift by the second mobile computing device; and
   converting the redemption value for the first cannabis gift from one of the available cannabis gifts to one of the redeemed cannabis gifts for the second user and recording the redemption value for the redeemed cannabis gift for the one of the cannabis suppliers selected on the UI of the second mobile computing device in the database.

2. The cannabis gifting method of claim 1 further comprising:
   displaying strain information for a cannabis product available at the one of the cannabis suppliers selected on the UI of the second mobile computing device.

3. The cannabis gifting method of claim 1 further comprising:
   displaying concentrates information for a cannabis product available at the one of the cannabis suppliers selected on the UI of the second mobile computing device.

4. The cannabis gifting method of claim 1 further comprising:

inputting a first message from the first user to the second user through the UI on the first mobile computing device;
transmitting the first message with the unique code and the first cannabis gift to the second mobile computing device; and
displaying the first message on the UI on the second mobile computing device.

5. The cannabis gifting method of claim 1 further comprising:
transmitting a text message indicating the first cannabis gift from the first mobile computing device to the second mobile computing device.

6. The cannabis gifting method of claim 1 further comprising:
transmitting an email message indicating the first cannabis gift from the first mobile computing device to the second mobile computing device.

7. The cannabis gifting method of claim 1 further comprising:
determining by the server that an age of the second user is below 21 years old; and
preventing the redeeming of the first cannabis gift.

8. The cannabis gifting method of claim 1 further comprising:
transmitting a payment for the redeemed cannabis gift to the one of the cannabis suppliers selected on the UI of the second mobile computing device.

9. The cannabis gifting method of claim 1 further comprising:
displaying the first cannabis gift as an available cannabis on the user interface on the second mobile computing device.

10. The cannabis gifting method of claim 1 further comprising:
displaying the first cannabis gift as a sent cannabis gift on the user interface of the application program on the first mobile computing device.

11. A cannabis edible gifting method comprising:
providing a server coupled to a network, a database and a plurality of mobile computing devices, wherein the plurality of mobile computing devices are in communication with the server through the network;
downloading an client application program to each of the plurality of mobile computing devices;
storing by the database, data for each of a plurality of users comprising: cannabis edible gifts, cannabis edible gifts available, and cannabis edible gifts claimed;
receiving by the server from a first mobile computing device, a first cannabis edible gift from a first user to a second user;
storing the first cannabis edible gift as one of the cannabis edible gifted for the first user and storing the first cannabis edible gift as one of the available food gift for the second user in the database;
generating a unique code by the server for the first cannabis edible gift;
recording the first unique code for the first cannabis edible gift in the database;
transmitting the first unique code and the first cannabis edible gift to a second mobile computing device by the server;
displaying the first cannabis edible gift on the second mobile computing device;
displaying a map showing locations of cannabis edible suppliers on the user interface (UI) of the second mobile computing device;
displaying a name, address, and phone number of the one of the cannabis edible suppliers selected on the UI of the second mobile computing device;
inputting a redemption value on the UI of the second mobile computing device;
clicking on a claim button on the UI to redeem the redemption value from the first cannabis edible gift by the second mobile computing device; and
converting the redemption value for the first cannabis edible gift from one of the available cannabis edible gifts to one of the redeemed cannabis edible gifts for the second user and recording the redemption value for the redeemed cannabis edible gift for the one of the cannabis edible suppliers selected on the UI of the second mobile computing device in the database.

12. The cannabis edible gifting method of claim 11 further comprising:
displaying cannabis quantity information for a cannabis edible product available at the one of the cannabis suppliers selected on the UI of the second mobile computing device.

13. The cannabis edible gifting method of claim 1 further comprising:
displaying flavor information for a cannabis product available at the one of the cannabis suppliers selected on the UI of the second mobile computing device.

14. The cannabis edible gifting method of claim 11 further comprising:
inputting a first message from the first user to the second user through the UI on the first mobile computing device;
transmitting the first message with the first token and the first cannabis edible gift to the second mobile computing device; and
displaying the first message on the UI on the second mobile computing device.

15. The cannabis edible gifting method of claim 11 further comprising:
transmitting a text message indicating the first cannabis gift from the first mobile computing device to the second mobile computing device.

16. The cannabis edible gifting method of claim 11 further comprising:
transmitting a payment for the redeemed cannabis edible to the food supplier.

17. The computer based cannabis edible gifting method of claim 11 further comprising:
displaying the first cannabis edible gift as an available cannabis edible on the UI of the second mobile computing device.

18. The computer based cannabis edible gifting method of claim 11 further comprising:
displaying the first cannabis edible gift as an sent cannabis edible gift on the user interface of the application program on the first mobile computing device.

19. A cannabis gifting method comprising:
providing a server coupled to a network, a database, and a plurality of mobile client computing devices, wherein the plurality of mobile computing devices are in communication with the server through the network;
downloading a client application program from the server to each of the plurality of mobile client computing devices;
storing by the database, data for each user of the plurality of mobile client computing devices, the data comprising: cannabis gifted, cannabis available, and cannabis claimed;

receiving by the server from a first mobile computing device, a first cannabis gift from a first user for delivery to a second user of a second mobile computing device;

receiving by the server from the second mobile computing device, a second cannabis gift from a first user for delivery to the first user of the first mobile computing device;

storing the first cannabis gift as one of the cannabis gifted for the first user, storing the first cannabis gift as an available cannabis for the second user, storing the second cannabis gift as one of the cannabis gifted for the second user, storing the second cannabis gift as an available cannabis for the first user in the database;

generating a first unique token by the server for the first cannabis gift and a second unique token by the server for the second cannabis gift;

recording the first unique token for the first cannabis gift and the second unique token for the second cannabis gift in the database;

transmitting the first unique token and the first cannabis gift to a second mobile computing device by the server;

displaying the first cannabis gift on the second mobile computing device;

displaying a map showing locations of cannabis suppliers on the user interface (UI) of the second mobile computing device;

selecting one of the cannabis suppliers on the UI of the second mobile computing device;

displaying a name, address, and phone number of the one of the cannabis suppliers selected on the UI of the second mobile computing device;

inputting a redemption value on the UI of the second mobile computing device;

transmitting the second unique token and the second cannabis gift to a first mobile computing device by the server;

displaying a user interface of the client application program on the second mobile computing device to a cannabis supplier;

displaying the user interface of the client application program on the first mobile computing device to a cannabis supplier;

redeeming the first cannabis gift by actuating a redeem control on the user interface of the client application program on the second mobile computing device;

redeeming the second cannabis gift by actuating the redeem control on the user interface of the client application program on the first mobile computing device;

storing the first cannabis gift as one of the redeemed cannabis for the second user and storing the second cannabis gift as one of the redeemed cannabis for the first user; and recording the redeemed cannabis for the one of the cannabis suppliers selected on the UI of the second mobile computing device in the database.

20. The cannabis gifting method of claim 19 further comprising:

transmitting a payment for the redeemed cannabis gift to the cannabis supplier.

\* \* \* \* \*